US008980394B2

(12) United States Patent
Franko, Sr. et al.

(10) Patent No.: US 8,980,394 B2
(45) Date of Patent: Mar. 17, 2015

(54) RESEALABLE LABEL

(75) Inventors: Joseph D. Franko, Sr., Hopkins, MN (US); Joseph D. Franko, Jr., Hopkins, MN (US)

(73) Assignee: Quality Assured Enterprises, Inc., Hopkins, MN (US)

( * ) Notice: Subject to any disclaimer, the term of this patent is extended or adjusted under 35 U.S.C. 154(b) by 312 days.

(21) Appl. No.: 13/521,619

(22) PCT Filed: Jan. 18, 2011

(86) PCT No.: PCT/US2011/021521

§ 371 (c)(1), (2), (4) Date: Jul. 11, 2012

(87) PCT Pub. No.: WO2011/090931

PCT Pub. Date: Jul. 28, 2011

(65) Prior Publication Data

US 2012/0328817 A1 Dec. 27, 2012

Related U.S. Application Data

(60) Provisional application No. 61/296,848, filed on Jan. 20, 2010.

(51) Int. Cl.

| | |
|---|---|
| ***B32B 3/10*** | (2006.01) |
| ***G09F 3/10*** | (2006.01) |
| ***G09F 3/00*** | (2006.01) |
| *G09F 3/02* | (2006.01) |

(52) U.S. Cl.

CPC ................ *G09F 3/10* (2013.01); *G09F 3/0288* (2013.01); *G09F 2003/0222* (2013.01); *G09F 2003/0229* (2013.01); *G09F 2003/0251* (2013.01); *G09F 2003/0273* (2013.01); *Y10S 428/905* (2013.01)

USPC ................................ 428/43; 283/81; 428/905

(58) Field of Classification Search

USPC ....................................... 428/43, 905; 283/81

See application file for complete search history.

(56) References Cited

U.S. PATENT DOCUMENTS

| | | | |
|---|---|---|---|
| 3,779,829 | A | 12/1973 | Wolff |
| 3,865,671 | A | 2/1975 | Kronsder |
| 4,473,429 | A | 9/1984 | Crankshaw |
| 4,518,450 | A | 5/1985 | Warmann |
| 4,533,586 | A | 8/1985 | Roule et al. |

(Continued)

FOREIGN PATENT DOCUMENTS

| | | | |
|---|---|---|---|
| EP | 1302333 | A2 | 4/2003 |
| EP | 1473245 | A1 | 11/2004 |

(Continued)

OTHER PUBLICATIONS

International Search Report and Written Opinion for PCT/US2011/058600 mailed Apr. 5, 2011.

(Continued)

*Primary Examiner* — Brent O'Hern

(74) *Attorney, Agent, or Firm* — Walter K. Roloff; Gerald E. Helget; Briggs and Morgan, P.A.

(57) ABSTRACT

A roll-fed label web for a resealable label includes a label ply and a material that permits non-destructive manipulation of the label ply. An individual resealable label is produced when the web is cut by a label application machine. The label further includes an active portion.

41 Claims, 22 Drawing Sheets

(56) References Cited

U.S. PATENT DOCUMENTS

| | | | |
|---|---|---|---|
| 4,589,943 | A | 5/1986 | Kimball et al. |
| 4,632,721 | A | 12/1986 | Hoffmann et al. |
| 4,680,080 | A | 7/1987 | Instance |
| 4,700,976 | A | 10/1987 | Loose |
| 4,727,667 | A | 3/1988 | Ingle |
| 5,017,261 | A | 5/1991 | Zodrow et al. |
| 5,048,870 | A | 9/1991 | Mangini et al. |
| 5,062,917 | A | 11/1991 | Zodrow |
| 5,078,826 | A | 1/1992 | Rogall |
| 5,215,622 | A | 6/1993 | Schmelzer |
| 5,263,743 | A | 11/1993 | Jones |
| 5,370,754 | A | 12/1994 | Soloman |
| 5,405,482 | A | 4/1995 | Morrissette et al. |
| 5,462,488 | A | 10/1995 | McKillip |
| 5,605,730 | A | 2/1997 | Treleaven |
| 5,727,819 | A | 3/1998 | Grosskopf et al. |
| 5,738,382 | A | 4/1998 | Grosskopf et al. |
| 5,741,381 | A | 4/1998 | Dolence et al. |
| 5,829,789 | A | 11/1998 | Treleaven et al. |
| 5,830,550 | A | 11/1998 | Treleaven et al. |
| 5,863,628 | A | 1/1999 | Barry |
| 5,975,582 | A | 11/1999 | Treleaven |
| 6,027,780 | A | 2/2000 | Treleaven et al. |
| 6,035,568 | A | 3/2000 | Grosskopf et al. |
| 6,048,423 | A | 4/2000 | Barrash et al. |
| 6,057,019 | A | 5/2000 | Barry |
| 6,086,697 | A | 7/2000 | Key |
| 6,120,637 | A | 9/2000 | Barry |
| 6,213,520 | B1 | 4/2001 | Treleaven et al. |
| 6,237,269 | B1 | 5/2001 | Key |
| 6,248,377 | B1 * | 6/2001 | Levine ............................ 426/87 |
| 6,270,121 | B1 | 8/2001 | Dolan et al. |
| 6,274,236 | B1 | 8/2001 | Shacklett et al. |
| 6,328,832 | B1 | 12/2001 | Otruba et al. |
| 6,329,034 | B1 | 12/2001 | Pendry et al. |
| 6,332,631 | B1 | 12/2001 | Kirk |
| 6,398,263 | B2 | 6/2002 | Treleaven et al. |
| 6,402,872 | B1 | 6/2002 | Key |
| 6,413,345 | B1 | 7/2002 | Treleaven |
| 6,428,639 | B1 | 8/2002 | Oldenburg et al. |
| 6,431,231 | B1 | 8/2002 | Braaten et al. |
| 6,550,171 | B1 | 4/2003 | De Werra et al. |
| 6,550,512 | B2 | 4/2003 | Yang |
| 6,561,246 | B2 | 5/2003 | Yang |
| 6,575,216 | B2 | 6/2003 | Yang |
| 6,598,608 | B1 | 7/2003 | Downey |
| 6,616,189 | B2 | 9/2003 | Raming |
| 6,631,578 | B2 | 10/2003 | Key |
| 6,669,804 | B2 | 12/2003 | Pendry et al. |
| 6,737,137 | B2 | 5/2004 | Franko, Sr. et al. |
| 6,752,431 | B1 | 6/2004 | Matthews et al. |
| 6,755,442 | B2 | 6/2004 | Franko, Sr. et al. |
| 6,786,515 | B2 | 9/2004 | Franko, Sr. |
| 6,793,755 | B2 | 9/2004 | Schaupp et al. |
| 6,811,640 | B2 | 11/2004 | Franko, Sr. |
| 7,087,298 | B2 | 8/2006 | Key |
| 7,172,220 | B2 | 2/2007 | Franko, Sr. |
| 7,172,668 | B2 | 2/2007 | Key |
| 7,179,514 | B2 | 2/2007 | Olsen et al. |
| 7,601,410 | B2 | 10/2009 | Matthews et al. |
| 7,871,479 | B2 | 1/2011 | Garland |
| 7,875,142 | B2 | 1/2011 | Matthews et al. |
| 7,926,851 | B2 | 4/2011 | Kaufman |
| 8,043,993 | B2 | 10/2011 | Roth et al. |
| 8,142,596 | B1 | 3/2012 | Valenti, Jr. et al. |
| 8,245,752 | B2 | 8/2012 | Lingier et al. |
| 2001/0004152 | A1 | 6/2001 | Treleaven et al. |
| 2001/0017181 | A1 | 8/2001 | Otruba et al. |
| 2001/0025442 | A1 | 10/2001 | Key |
| 2001/0045741 | A1 | 11/2001 | Shacklett et al. |
| 2001/0052386 | A1 | 12/2001 | Treleaven et al. |
| 2002/0015813 | A1 | 2/2002 | Pendry et al. |
| 2002/0017784 | A1 | 2/2002 | Merry et al. |
| 2002/0038685 | A1 * | 4/2002 | Key .............................. 156/184 |
| 2002/0096261 | A1 | 7/2002 | Yang |
| 2002/0096262 | A1 | 7/2002 | Yang |
| 2002/0096264 | A1 | 7/2002 | Yang |
| 2002/0130182 | A1 | 9/2002 | Mondie |
| 2002/0171238 | A1 | 11/2002 | Kozlowski et al. |
| 2002/0185212 | A1 | 12/2002 | Schaupp et al. |
| 2002/0193225 | A1 | 12/2002 | Raming |
| 2003/0006606 | A1 * | 1/2003 | Franko et al. .................. 283/81 |
| 2003/0015105 | A1 | 1/2003 | Dewig et al. |
| 2003/0017293 | A1 | 1/2003 | Franko et al. |
| 2003/0030270 | A1 | 2/2003 | Franko, Sr. et al. |
| 2003/0091819 | A1 | 5/2003 | Franko, Sr. |
| 2003/0118768 | A1 | 6/2003 | Sellars |
| 2003/0175463 | A1 | 9/2003 | Olsen et al. |
| 2003/0189490 | A1 | 10/2003 | Hogerton et al. |
| 2004/0108055 | A1 | 6/2004 | Franko |
| 2004/0123565 | A1 | 7/2004 | Rice et al. |
| 2004/0166277 | A1 | 8/2004 | Key |
| 2004/0197513 | A1 | 10/2004 | Shacklett et al. |
| 2004/0207193 | A1 | 10/2004 | Franko, Sr. |
| 2004/0244242 | A1 | 12/2004 | Maliner et al. |
| 2005/0076549 | A1 | 4/2005 | Sellars |
| 2005/0181165 | A1 | 8/2005 | Franko, Sr. |
| 2005/0190914 | A1 | 9/2005 | Chen et al. |
| 2006/0029761 | A1 | 2/2006 | Matthews et al. |
| 2006/0078701 | A1 | 4/2006 | Glasier |
| 2006/0145471 | A1 | 7/2006 | Franko, Sr. |
| 2007/0034103 | A1 | 2/2007 | Kaufman |
| 2007/0209753 | A1 | 9/2007 | Gonzalez et al. |
| 2007/0209755 | A1 | 9/2007 | Smith |
| 2007/0213214 | A1 | 9/2007 | Roth et al. |
| 2007/0221319 | A1 | 9/2007 | Morgan |
| 2007/0252379 | A1 | 11/2007 | Bethune et al. |
| 2008/0003391 | A1 | 1/2008 | Franko et al. |
| 2008/0003410 | A1 | 1/2008 | Shacklett et al. |
| 2008/0014344 | A1 | 1/2008 | Fort et al. |
| 2008/0073902 | A1 | 3/2008 | Franko |
| 2008/0236733 | A1 | 10/2008 | Hudetz |
| 2008/0303264 | A1 | 12/2008 | Kaufman |
| 2008/0303265 | A1 | 12/2008 | Kaufman |
| 2009/0236023 | A1 | 9/2009 | Lingier et al. |
| 2009/0255623 | A1 | 10/2009 | Bagung et al. |
| 2010/0010681 | A1 | 1/2010 | Zugibe et al. |
| 2010/0044438 | A1 | 2/2010 | Chen et al. |
| 2010/0084077 | A1 | 4/2010 | Matthews et al. |
| 2010/0240133 | A1 | 9/2010 | Brivanlou et al. |
| 2010/0295916 | A1 | 11/2010 | Kaufman |
| 2010/0300599 | A1 | 12/2010 | Fort et al. |
| 2010/0307947 | A1 | 12/2010 | Marden et al. |
| 2011/0052850 | A1 | 3/2011 | Seidl |
| 2011/0151115 | A1 | 6/2011 | Lingier |
| 2011/0233095 | A1 | 9/2011 | Seidl |
| 2012/0037299 | A1 | 2/2012 | Baeta et al. |
| 2012/0125526 | A1 | 5/2012 | Key |
| 2012/0268837 | A1 | 10/2012 | Rittenburg et al. |
| 2012/0279632 | A1 | 11/2012 | Lingier et al. |
| 2013/0319604 | A1 | 12/2013 | Delise, Jr. |

FOREIGN PATENT DOCUMENTS

| | | | |
|---|---|---|---|
| WO | WO9716109 | | 5/1997 |
| WO | 98/43226 | A1 | 10/1998 |
| WO | WO0179372 | A2 | 10/2001 |
| WO | 02/096331 | A2 | 12/2002 |
| WO | 2005/048220 | A1 | 5/2005 |
| WO | WO2005048220 | A1 | 5/2005 |
| WO | 2011088029 | | 7/2011 |

OTHER PUBLICATIONS

International Search Report and Written Opinion for PCT/US2011/020804 mailed May 2, 2011.

PCT International Search and Written Opinion for PCT/US2011/021521.

International Search Report and Written Opinion for PCT/US2013/050643 mailed Dec. 13, 2013.

International Search Report and Written Opinion from PCT/US2014/034379 mailed Aug. 28, 2014.

* cited by examiner

RESEALABLE LABEL

CROSS-REFERENCE TO RELATED APPLICATION

This application is a national stage application of PCT Application No. PCT/US2011/021521, filed on Jan. 18, 2011, which claims priority to provisional patent application, Ser. No. 61/296,848, filed Jan. 20, 2010.

TECHNICAL FIELD

This disclosure relates generally to labels. More particularly, this disclosure relates to a resealable label that may be used with roll-fed labeling equipment for application to containers and other objects.

BACKGROUND OF THE INVENTION

In the printing arts, and in particular in the printed label art for labeling and decorating objects, there exists a continual demand for labels and decorations which not only appeal to consumers, but also bear ever increasing amounts of information. For example, labels for identification of health care and pharmaceutical products are often required by governmental regulations to describe in painstaking detail their compositions and ingredients. As new food and drug laws are passed, regulations require the inclusion of increasing amounts of label information. As another example, labels for identification of agricultural and industrial products are similarly required by governmental regulations to describe their compositions and ingredients by way of, e.g., "material safety data sheets" and the like.

One label that has gained wide popularity is a so-called "roll-fed" label. A roll-fed label commonly utilizes a continuous label substrate or ply comprising paper, or a clear or opaque film such as polypropylene, or a combination of paper and film. In such an individual label, in its final state, the label ply is usually rectangular, as defined by a desired label width associated with a widthwise dimension and a desired label length associated with a lengthwise dimension (transverse to the widthwise dimension). The label ply has opposing first and second ends, along with front and back surfaces. Desired graphics are typically printed on the front surface of the label ply, and may also be printed on the back surface. In application of the roll-fed label to an object to be labeled, e.g., a cylindrical container, a widthwise portion of the back surface of the label ply at the first end thereof is adhered to the container by means of an adhesive material at point of application from labeling equipment. The ply, having been adhesively secured to the container at the first end, is then placed in circular fashion around the container and adhesively secured at the second end of the ply. The length of the ply is usually chosen to approximate a circumference of the container, to minimize excessive overlap of the opposing ends of the label substrate applied to the container. The application of the label to the container may be carried out by any suitable roll-fed label applicator such as those available from, e.g., Krones A.G. of Regensburg, Germany, and B&H Labeling Systems of Ceres, Calif., U.S.A.

Roll-fed labels of the type described herein are manufactured for application by customers using conventional roll-fed labeling equipment or machines. They are produced without any adhesive material on the back surface of the label ply; and as such they are provided to customers in roll form as a web.

Typically, at point of application, a web of labels in roll form is introduced to a customer's label application machine which cuts the web into individual labels and applies them to objects to be labeled (e.g., containers). Any adhesive material used to apply the labels to the objects is supplied by the label application machine at the point of application and is generally applied to adhere the leading and trailing edge portions of the labels.

Therefore, there exists a need for a resealable label for roll-fed label application equipment or machines, that does not require significant changes to label ply materials or other labeling components. There also exists a need for a resealable label that satisfactorily functions when applied to a container such as a conventional aerosol spray can, subsequently with a cap, even when the cap abuts or covers a portion of the label.

SUMMARY OF THE INVENTION

This disclosure describes novel labels for roll-fed label application equipment or machines, for application of the labels to objects to be labeled.

In one aspect, a roll-fed label web for a resealable label includes a label ply and a material that permits non-destructive manipulation of the label ply. An individual resealable label is produced when the roll-fed label web is cut by a label application machine. The resealable label further includes an active portion. In one embodiment, the active portion comprises a selected height and a selected length of the label. In one embodiment, the label further comprises at least one break path. In one embodiment, the label further comprises an accessory that is removably secured within the active portion. In one embodiment, the active portion is provided in an interior portion of the label to open in a selected direction. In one embodiment, the active portion is a removable coupon. In one embodiment, the active portion is removable to thereby create a window to a surface of a container to which the label is adhered. In one embodiment, the label ply is an opaque material. In one embodiment, the label ply has (i) at least a first portion having first selected dimensions and (ii) at least a second portion having second selected dimensions that are smaller than the first selected dimensions. In one embodiment, the label ply has at least one portion that is cut and removed from the ply to thereby provide an overbite area when the label is adhered to an object. In one embodiment, the label ply has at least one portion that is cut and removed from the ply to thereby provide an underbite area when the label is adhered to an object. In one embodiment, the label ply has at least one irregularly shaped portion that forms a lift tab. In one embodiment, the label further comprises a scratch and sniff feature.

In another aspect, a roll-fed label web for a resealable label includes a label ply that inherently has a property that permits non-destructive manipulation of the label. An individual resealable label is produced when the roll-fed label web is cut by a label application machine. The resealable label further includes an active portion. In one embodiment, the active portion comprises a selected height and a selected length of the label. In one embodiment, the label further comprises at least one break path. In one embodiment, the label further comprises an accessory that is removably secured within the active portion. In one embodiment, the active portion is provided in an interior portion of the label to open in a selected direction. In one embodiment, the active portion is a removable coupon. In one embodiment, the active portion is removable to thereby create a window to a surface of a container to which the label is adhered. In one embodiment, the label ply is an opaque material. In one embodiment, the label ply has (i)

at least a first portion having first selected dimensions and (ii) at least a second portion having second selected dimensions that are smaller than the first selected dimensions. In one embodiment, the label ply has at least one portion that is cut and removed from the ply to thereby provide an overbite area when the label is adhered to an object. In one embodiment, the label ply has at least one portion that is cut and removed from the ply to thereby provide an underbite area when the label is adhered to an object. In one embodiment, the label ply has at least one irregularly shaped portion that forms a lift tab. In one embodiment, the label further comprises a scratch and sniff feature.

In another aspect, a roll-fed label web for a resealable label includes a label ply from which an individual resealable label is produced when the roll-fed label web is cut by a label application machine. The label application machine provides an adhesive material of sufficiently low aggressiveness to the resealable label at point of application to permit non-destructive manipulation thereof. The resealable label further includes an active portion. In one embodiment, the active portion comprises a selected height and a selected length of the label. In one embodiment, the label further comprises at least one break path. In one embodiment, the label further comprises an accessory that is removably secured within the active portion. In one embodiment, the active portion is provided in an interior portion of the label to open in a selected direction. In one embodiment, the active portion is a removable coupon. In one embodiment, the active portion is removable to thereby create a window to a surface of a container to which the label is adhered. In one embodiment, the label ply is an opaque material. In one embodiment, the label ply has (i) at least a first portion having first selected dimensions and (ii) at least a second portion having second selected dimensions that are smaller than the first selected dimensions. In one embodiment, the label ply has at least one portion that is cut and removed from the ply to thereby provide an overbite area when the label is adhered to an object. In one embodiment, the label ply has at least one portion that is cut and removed from the ply to thereby provide an underbite area when the label is adhered to an object. In one embodiment, the label ply has at least one irregularly shaped portion that forms a lift tab. In one embodiment, the label further comprises a scratch and sniff feature.

DETAILED DESCRIPTION

Figure 1:
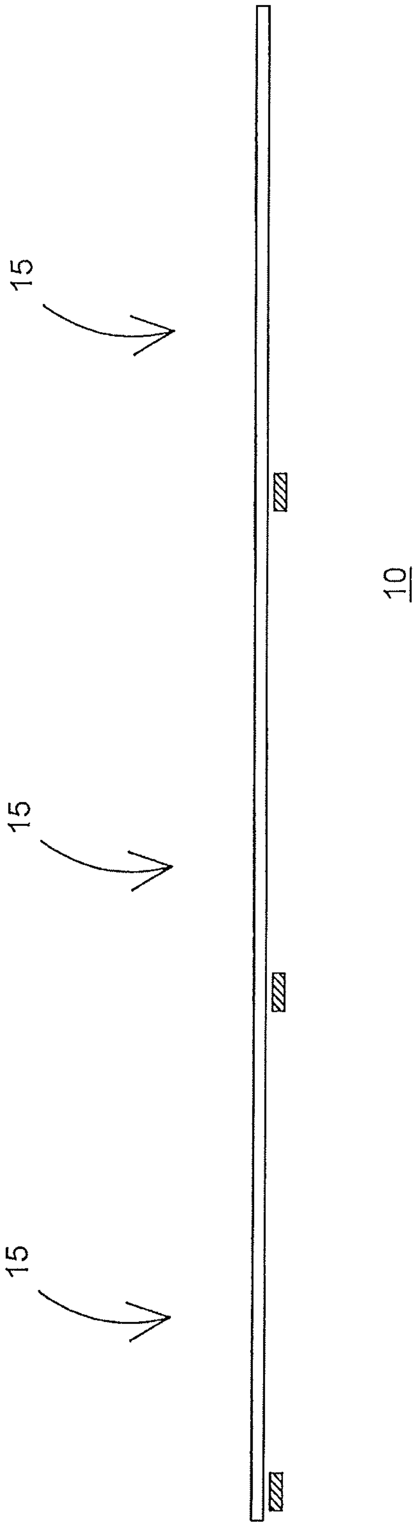
FIG. 1 is a cross-sectional illustration of a portion of a label web.
Figure 1A:
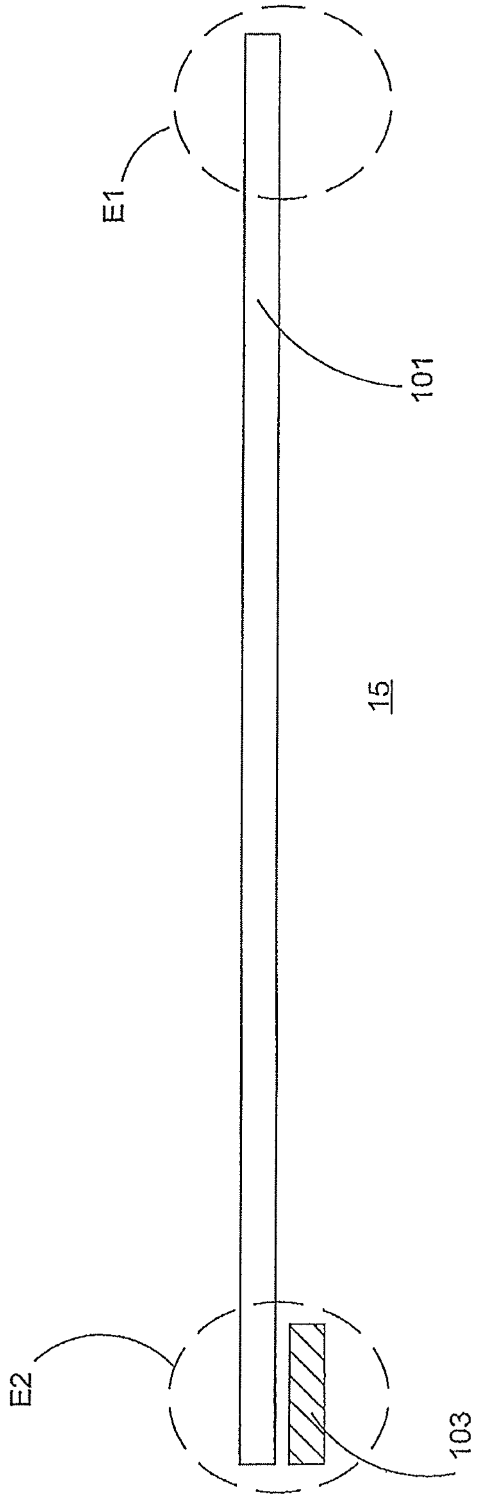
FIG. 1*a* is a cross-sectional view of an example of a single resealable label, cut from the web of FIG. 1.

One embodiment of a resealable label is illustrated in FIGS. 1 and 1*a*, in cross-section as a portion of a label web and as a separate, individual label cut from the web, respectively. The label web includes a label ply.

As used throughout this disclosure, the term "active portion" refers to a portion of a resealable label that is intended to be manipulated by, typically, a consumer or end-user to access information or graphics. Also as used throughout this disclosure, it is to be understood that the term "manipulation" includes, but is not limited to, acts of opening and closing or re-sealing the label, or removal of the active portion, without unintended destruction of the label ply or the object to which the label has been applied.

It is to be noted that a resealable label, for application to an object to be labeled utilizing separately supplied adhesive material with a roll-fed label application machine, includes a label ply having a first lengthwise dimension, a first widthwise dimension, a front surface that is capable of bearing graphic images and coatings, and an adhesive-free back surface that is also capable of bearing graphic images and coatings and capable of being adhesively coupled to an object to be labeled using separately supplied adhesive material at point of application. Specifically, when manufactured and prior to being applied to an object of interest to be labeled, the back surface of the label ply is free of adhesive material. In this state, it can then be supplied as a continuous web in roll form to a conventional roll-fed label application machine.

It is to be understood that the label ply in a resealable label may be a single ply of material, whether coated or uncoated, a so-called clear protective laminate construction, or any laminated, combined ply, or co-extruded construction of any desired number of individual plies or layers comprising the label ply itself. It is also to be appreciated and understood that with respect to a construction such as, for example, an aforementioned laminate or laminated construction, a laminate material could itself also include any desired graphic images and coatings on any of its surfaces.

With particular reference to FIG. 1*a*, a cross-sectional view of an example of a single resealable label, 15, cut from a web, 10, of FIG. 1, is illustrated. Label 15 includes label ply 101, material 103 that permits non-destructive manipulation of the label as will be described, and opposing ends E1 and E2 resulting from cuts made in web 10 by an application machine.

Figure 1B:
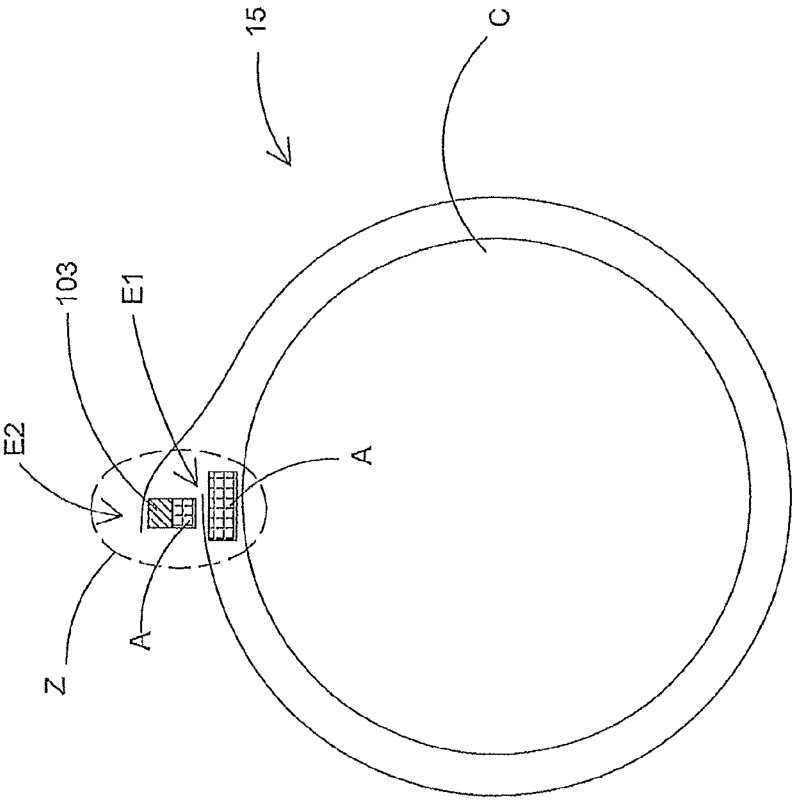
FIG. 1*b* is an illustration of the label of FIG. 1*a*, adhered to a container.

FIG. 1*b* depicts the embodiment of label 15 shown in FIG. 1*a* as adhered to a container C with adhesive material (A) separately supplied, at point of application, by labeling equipment. As known in the roll-fed label art and as shown in the drawing, it is usual and customary to allow or provide for some slight overlap in an overlap zone (Z).

It is to be understood that application of end E1 to container C—and subsequent encircling of container C by label 15—could enable end E2 by way of material 103 on the back surface of ply 101 at end E2, to be proximate and releasably coupled to a front surface of ply 101 and container C in combination with adhesive material (A). It is also to be understood that this relatively small amount of material 103 shown in FIGS. 1 and 1*a* on the back surface of ply 101 could alternatively be provided on any portion, or all portions, of the back and front surfaces of ply 101.

Figure 1C:
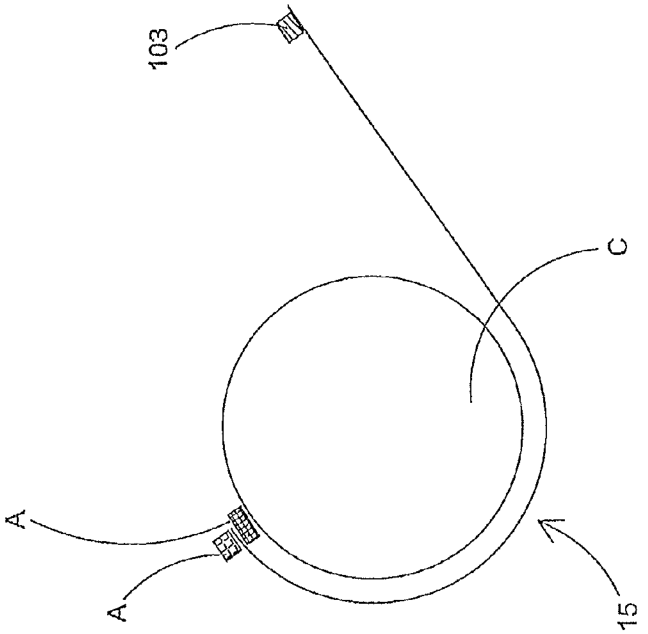
FIG. 1*c* is an illustration of the label of FIG. 1*b*, having been subsequently opened.

FIG. 1*c* depicts label 15 of FIGS. 1*a* and 1*b* as having been subsequently opened by, e.g., a consumer or end-user. It is to be understood that such an embodiment of a resealable label could ultimately be opened to a point where the label is adhered to the container and then resealed by re-encircling the label around the container; and that therefore a relatively large amount of available surface area (e.g., for desired graphics) could be provided by such a construction.

Figure 2:
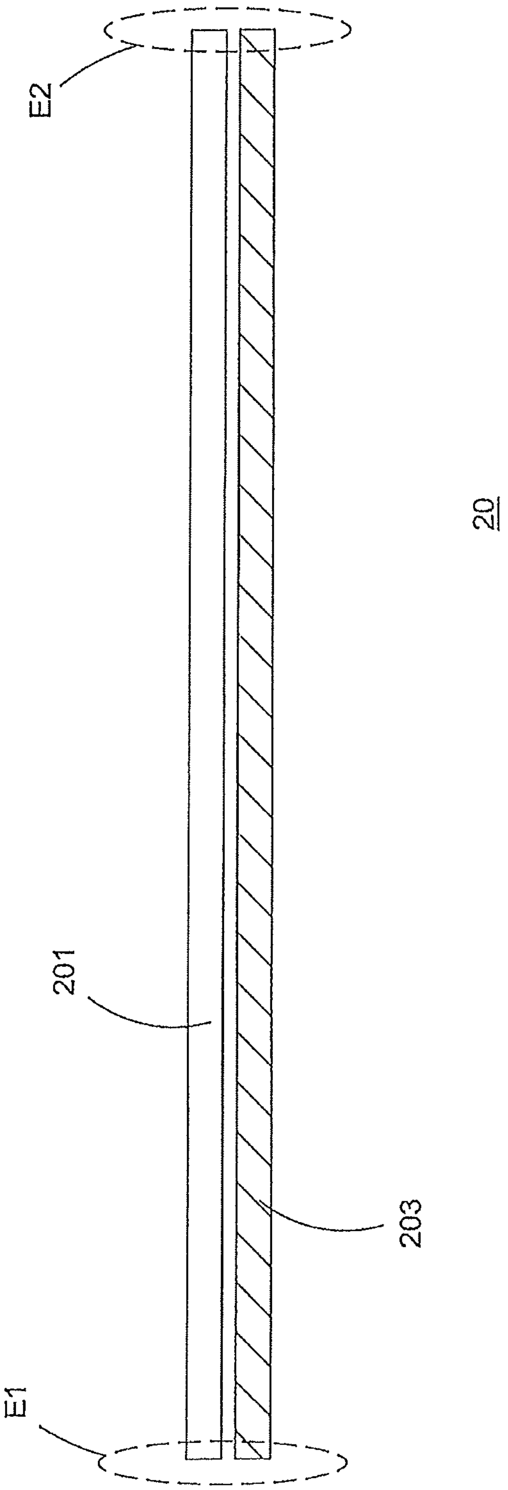
FIG. 2 is a cross-sectional illustration of another embodiment of a resealable label.

FIG. 2 is a cross-sectional illustration of another example of a single resealable label, 20. Label 20 includes a label ply 201, a flood coat of material 203 that permits non-destructive manipulation of the label as will be described, and opposing ends E1 and E2 resulting from cuts (not illustrated) made in a web by an application machine.

Figure 3:
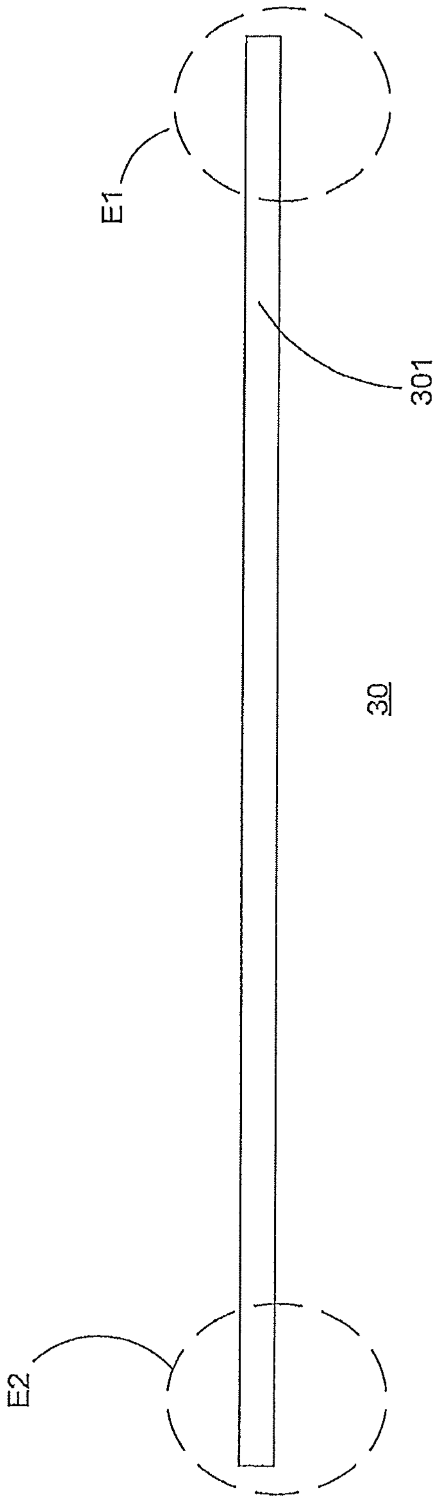
FIG. 3 is a cross-sectional illustration of another embodiment of a resealable label.

FIG. 3 is a cross-sectional illustration of another example of a single resealable label, 30. Label 30 includes a label ply 301 and opposing ends E1 and E2 resulting from cuts (not illustrated) made in a web by an application machine. It is to be appreciated, in this example of a resealable label, that no material is present that permits non-destructive manipulation of the label. In such an example that intentionally omits such material, the label may, for example, utilize a ply material that inherently has a property that permits non-destructive manipulation of the label. Furthermore, an adhesive material having a sufficiently low aggressiveness (e.g., a removable, low-tack, or "peelable" adhesive material) could be utilized at point of application with a label ply (e.g., paper or film) that does not have an inherent property that permits non-destructive manipulation of the label. In such an application, the adhesive material at point of application of sufficiently low aggressiveness could inhibit destruction of the ply while still maintaining the label's releasability and resealability.

It is to be appreciated and understood that materials which permit non-destructive manipulation of the labels, that are employed to provide various embodiments of a resealable label, may take any desired form, pattern, or configuration, whether fully or partially across the label ply. Although not illustrated, it is to be understood that the materials which permit non-destructive manipulation of the labels could be provided on a front surface as well as a back surface of a label ply, or both.

It is to be understood that, as used herein, the terms "pattern" and "flood coat" may, in a particular embodiment, pertain to any coating or material that is provided across an entire surface, or substantially so, of a ply material—or within any desired boundaries or margins about the ply material.

Figure 4:
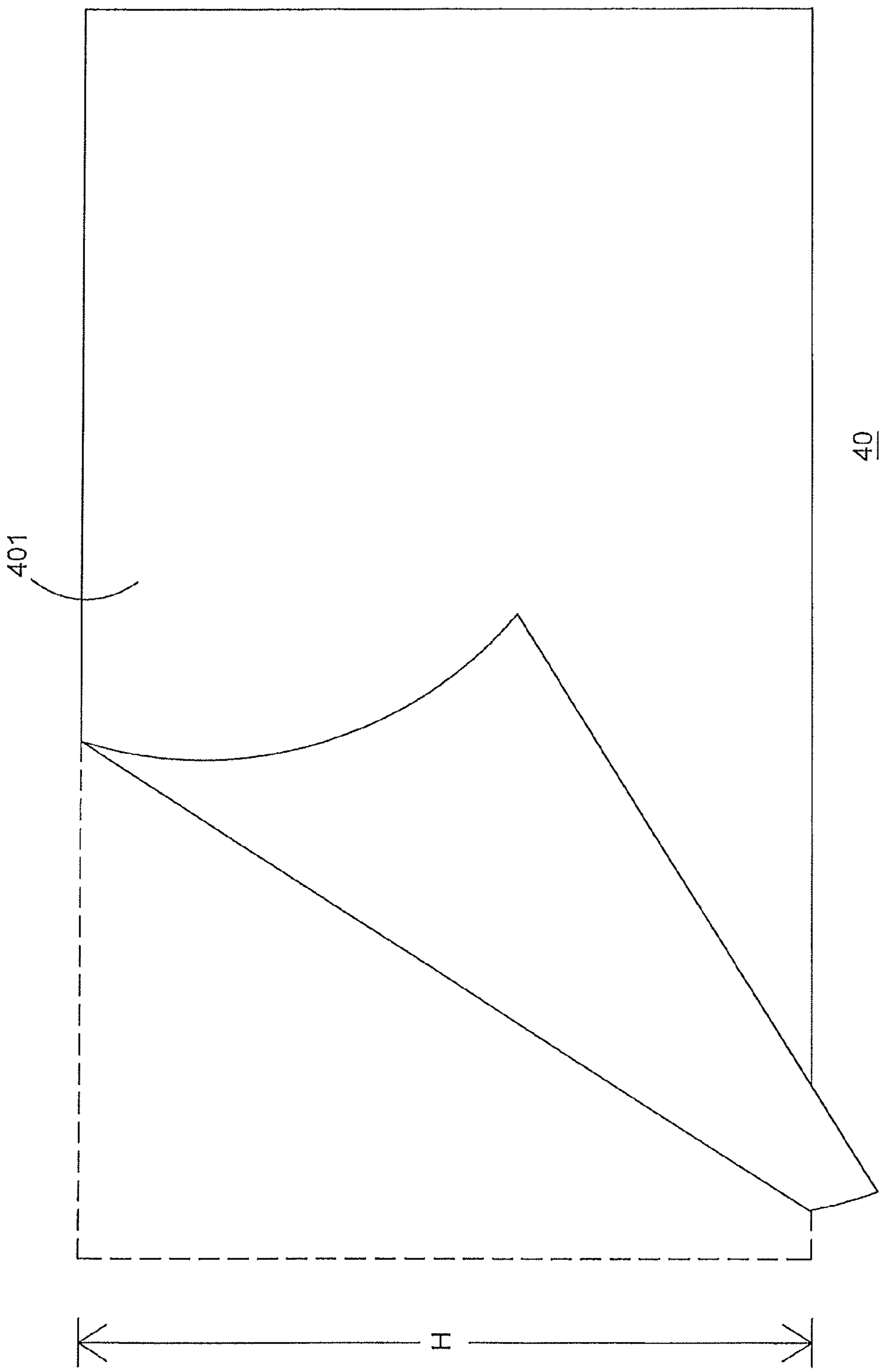
FIG. 4 is a top view illustration of an embodiment of a partially opened resealable label.

FIG. 4 is a top view illustration of another embodiment of a partially opened resealable label, 40. Label 40 includes a label ply 401. It is to be appreciated in this embodiment that an entire height H and length of label 40 could serve as an active portion and be provided to open in any desired direction.

Figure 4A:
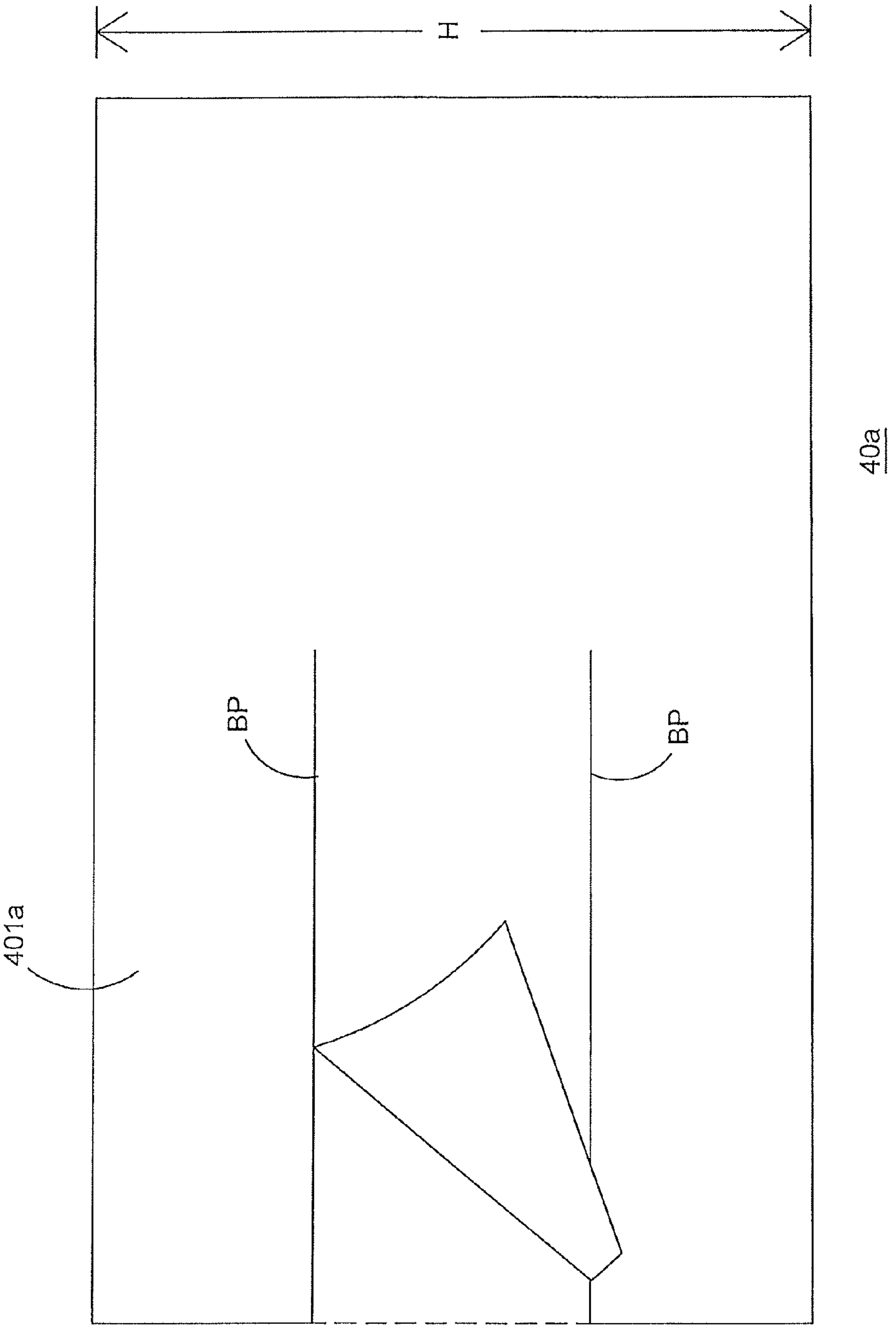
FIG. 4*a* is a top view illustration of another embodiment of a partially opened resealable label.

FIG. 4*a* is a top view illustration of another embodiment of a partially opened resealable label, 40*a*. Label 40*a* includes a label ply 401*a* that is selectively cut by defining a desired break path (BP), e.g., a slit, a cut, a perforation, a score, or a break, by means of, e.g., a steel knife, a heating element, a laser, or a die-cutting process; or, a printed instruction to an end-user to use a cutting implement such as scissors. It is to be appreciated that any selected portion of height H of a label could serve as an active portion and be provided to open in any desired direction.

Figure 4B:
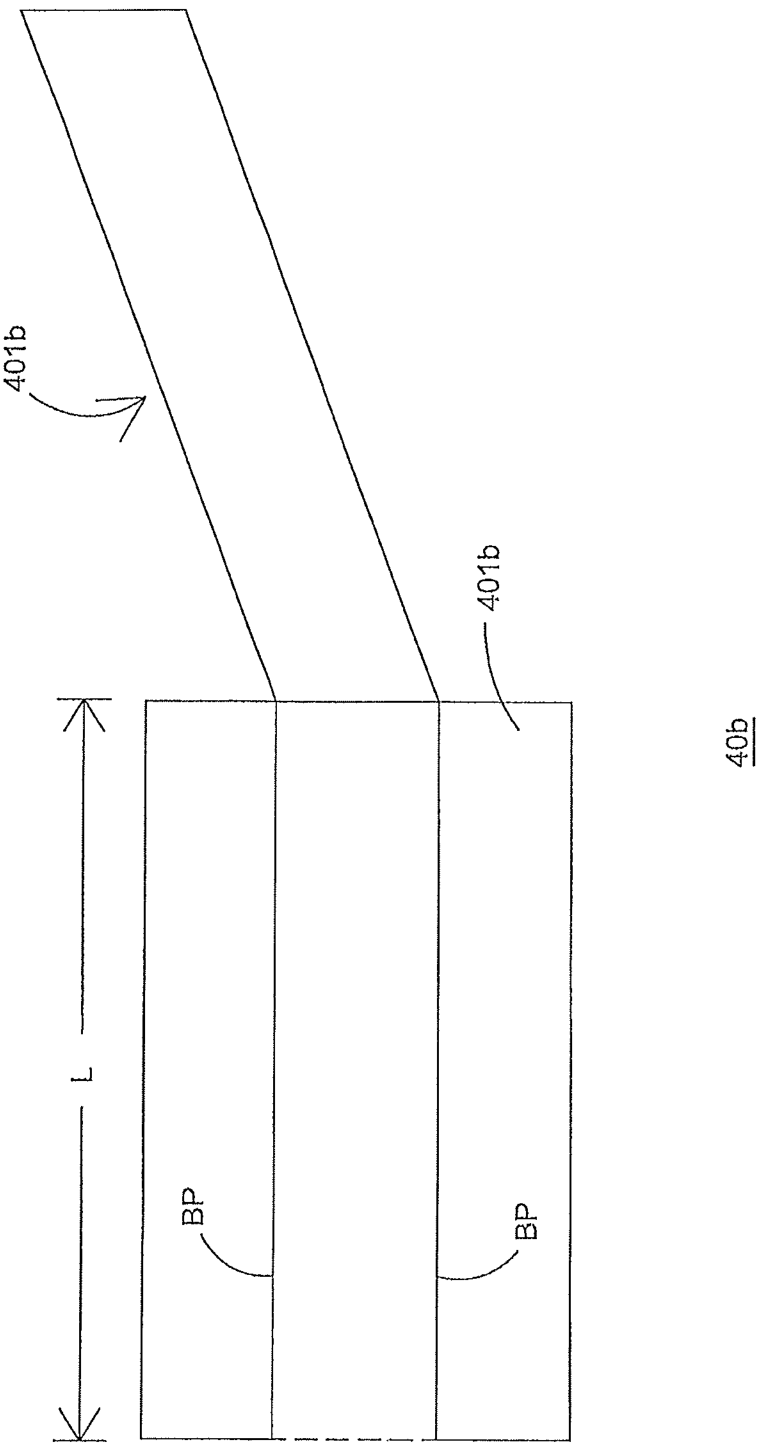
FIG. 4*b* is a top view illustration of an embodiment of a fully opened resealable label.

FIG. 4*b* is a top view illustration of another embodiment of a fully opened resealable label, 40*b*. Label 40*b* includes a label ply 401*b* that is selectively cut by defining a desired break path (BP), e.g., a slit, a cut, a perforation, a score, or a break, by means of, e.g., a steel knife, a heating element, a laser, or a die-cutting process; or, a printed instruction to an end-user to use a cutting implement such as a scissors. It is to be appreciated that any selected portion of a length L of a label (for example, an entire length L as shown in the drawing) could serve as an active portion and be provided to open in any desired direction, with break paths BP in ply 401*b* being adjusted accordingly.

Figure 5:
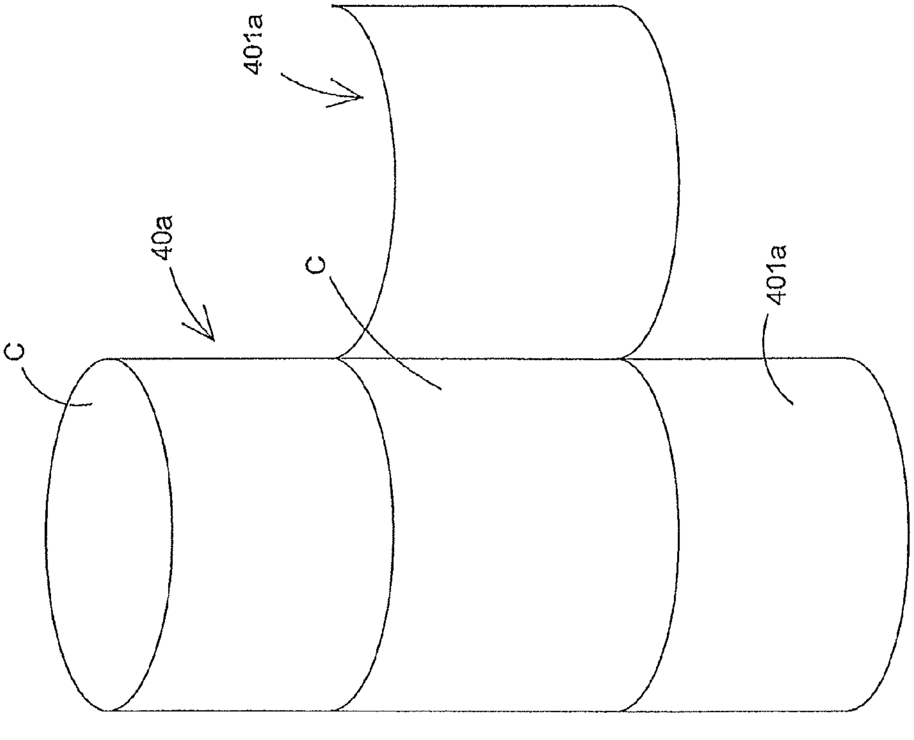
FIG. 5 is an illustration of the label of FIG. 4*a*, adhered to a container.
Figure 5A:
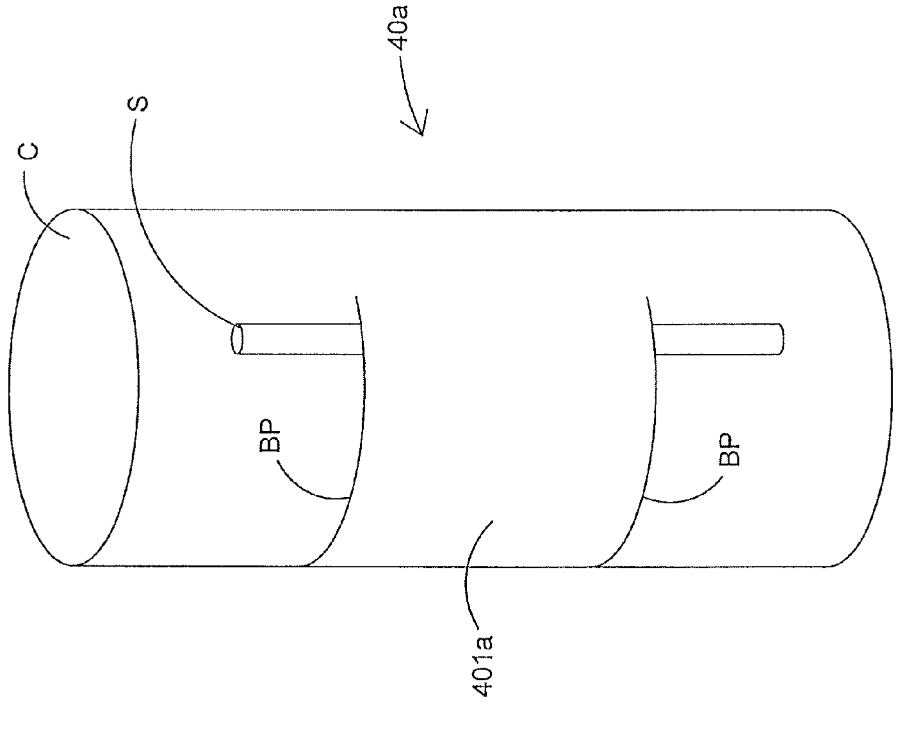
FIG. 5*a* is an illustration of the label of FIG. 4*a* adhered to a container, with an accessory.

In FIG. 5, label 40*a* is illustrated as having been applied to a container C. In FIG. 5*a*, label 40*a* is again illustrated as having been applied to container C with, additionally, an accessory such as, e.g., a conduit or straw S removably secured within an active portion of label 40*a* defined between ply 401*a* and container C.

Figure 6:
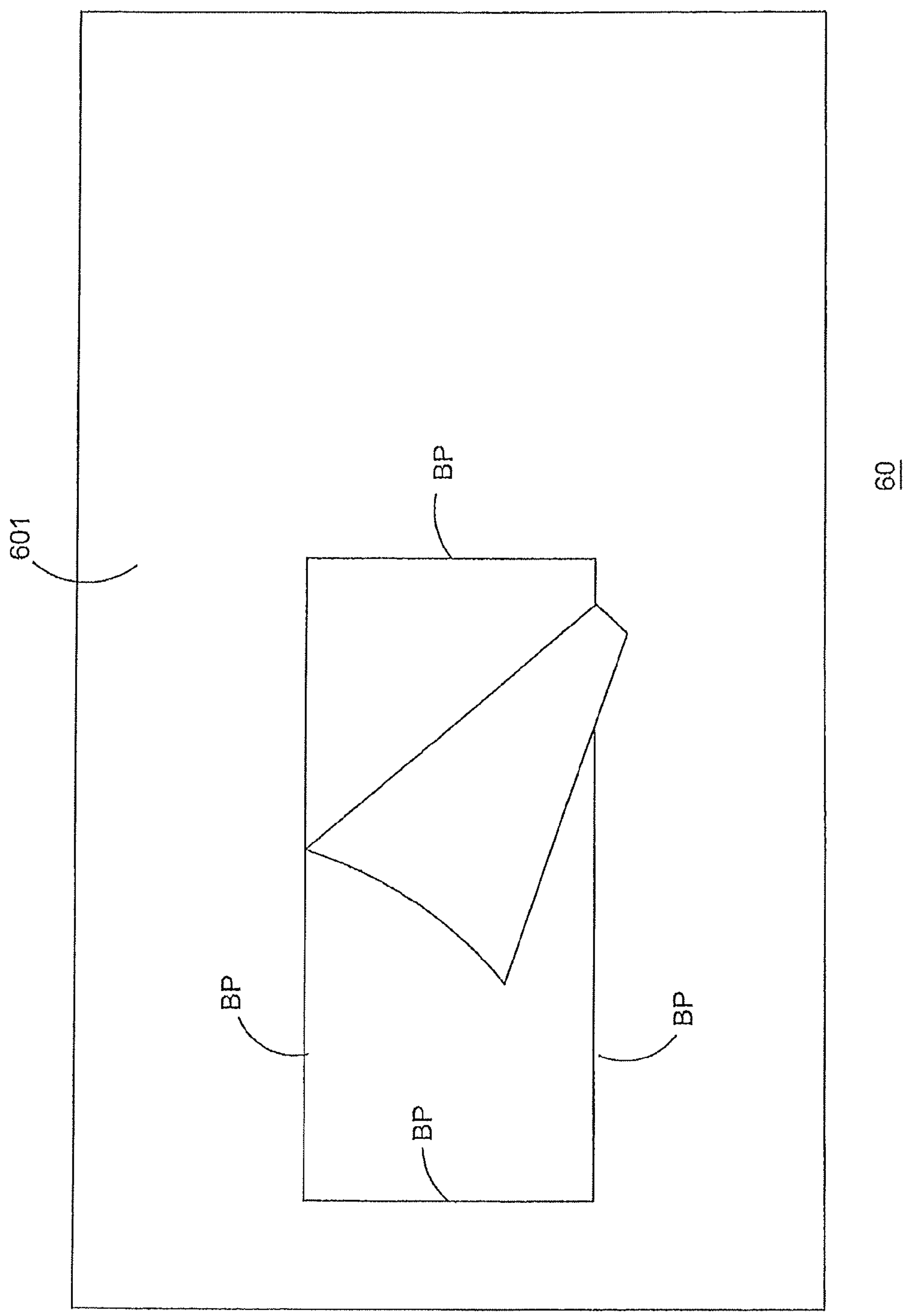
FIG. 6 is a top view illustration of another embodiment of a resealable label.

FIG. 6 is a top view illustration of another embodiment of a partially opened resealable label, 60. Label 60 includes a label ply 601 that is selectively cut by defining a desired break path (BP), e.g., a slit, a cut, a perforation, a score, or a break, by means of, e.g., a steel knife, a heating element, a laser, or a die-cutting process; or, a printed instruction to an end-user to use a cutting implement such as a scissors. It is to be appreciated that any selected portion of a label could serve as an active portion and be provided from an interior portion of the label toward any end thereof, and be provided to open in any desired direction. Furthermore, in such a label the active portion could comprise, for example as shown in FIG. 6, a coupon that could be provided in any orientation and in any portion of the label ply. In a coupon embodiment the active portion could, for example, be removed by a consumer or end-user without unintended destruction of the label ply or the object to which the label has been applied.

Figure 7:
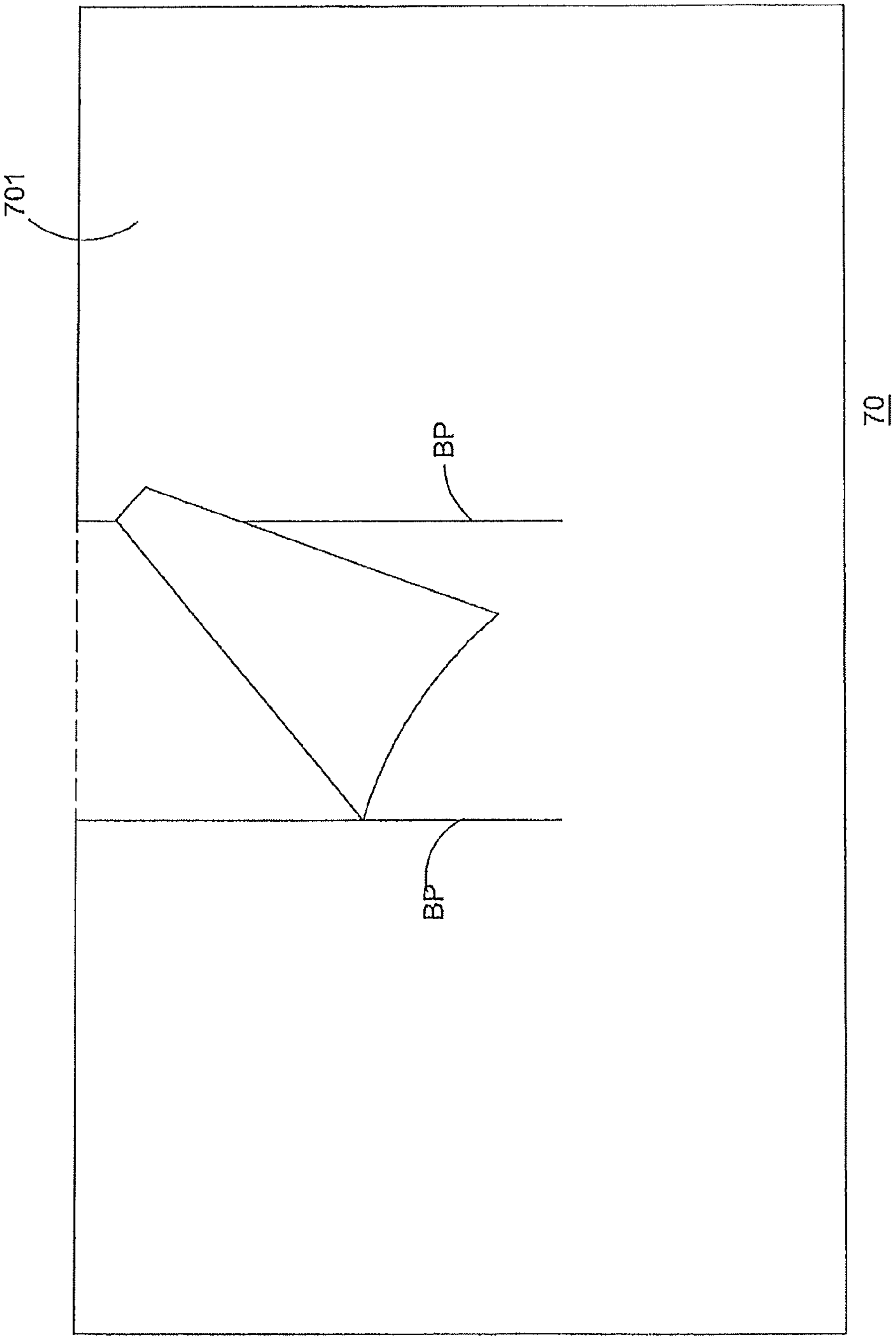
FIG. 7 is a top view illustration of another embodiment of a partially opened resealable label.
Figure 7A:
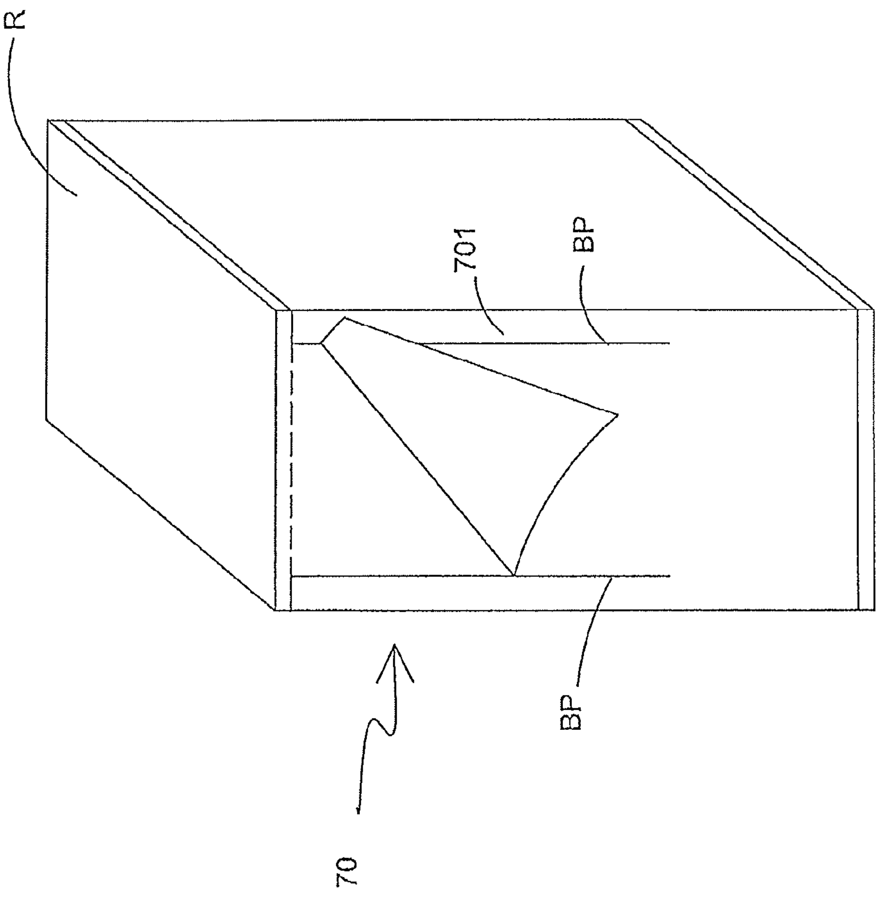
FIG. 7*a* is an illustration of the label of FIG. 7, adhered to a container.

FIG. 7 is a top view illustration of another embodiment of a partially opened resealable label, 70. Label 70 includes a label ply 701 that is selectively cut by defining a desired break path (BP), e.g., a slit, a cut, a perforation, a score, or a break, by means of, e.g., a steel knife, a heating element, a laser, or a die-cutting process; or, a printed instruction to an end-user to use a cutting implement such as a scissors. It is to be appreciated that any selected portion of a label could serve as an active portion and be provided in top-down fashion as shown in the drawing for, e.g., a non-cylindrical container R as shown in FIG. 7*a*, or be provided to open in any desired direction.

Figure 8:
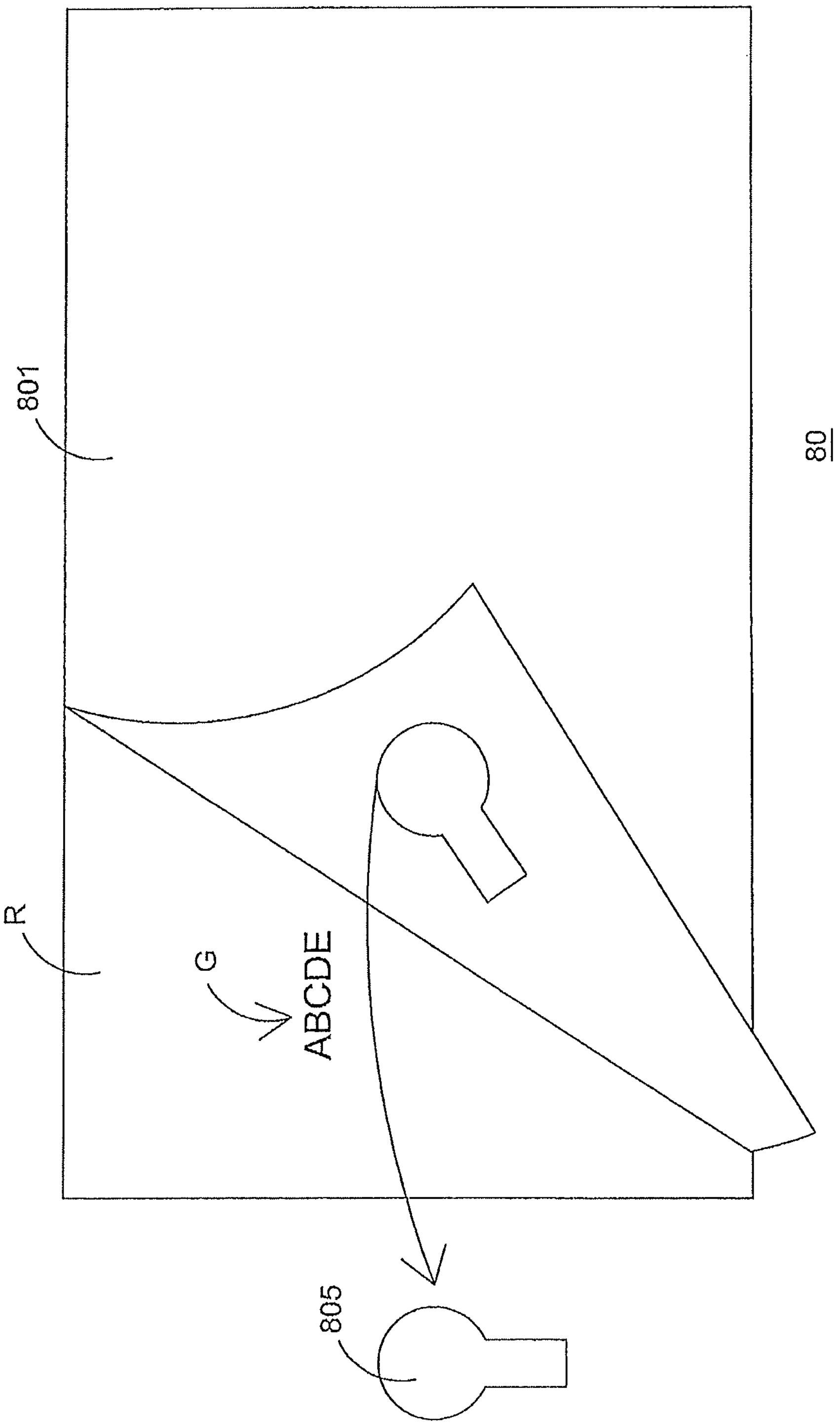
FIG. 8 is a top view illustration of another embodiment of a partially opened resealable label.
Figure 8A:
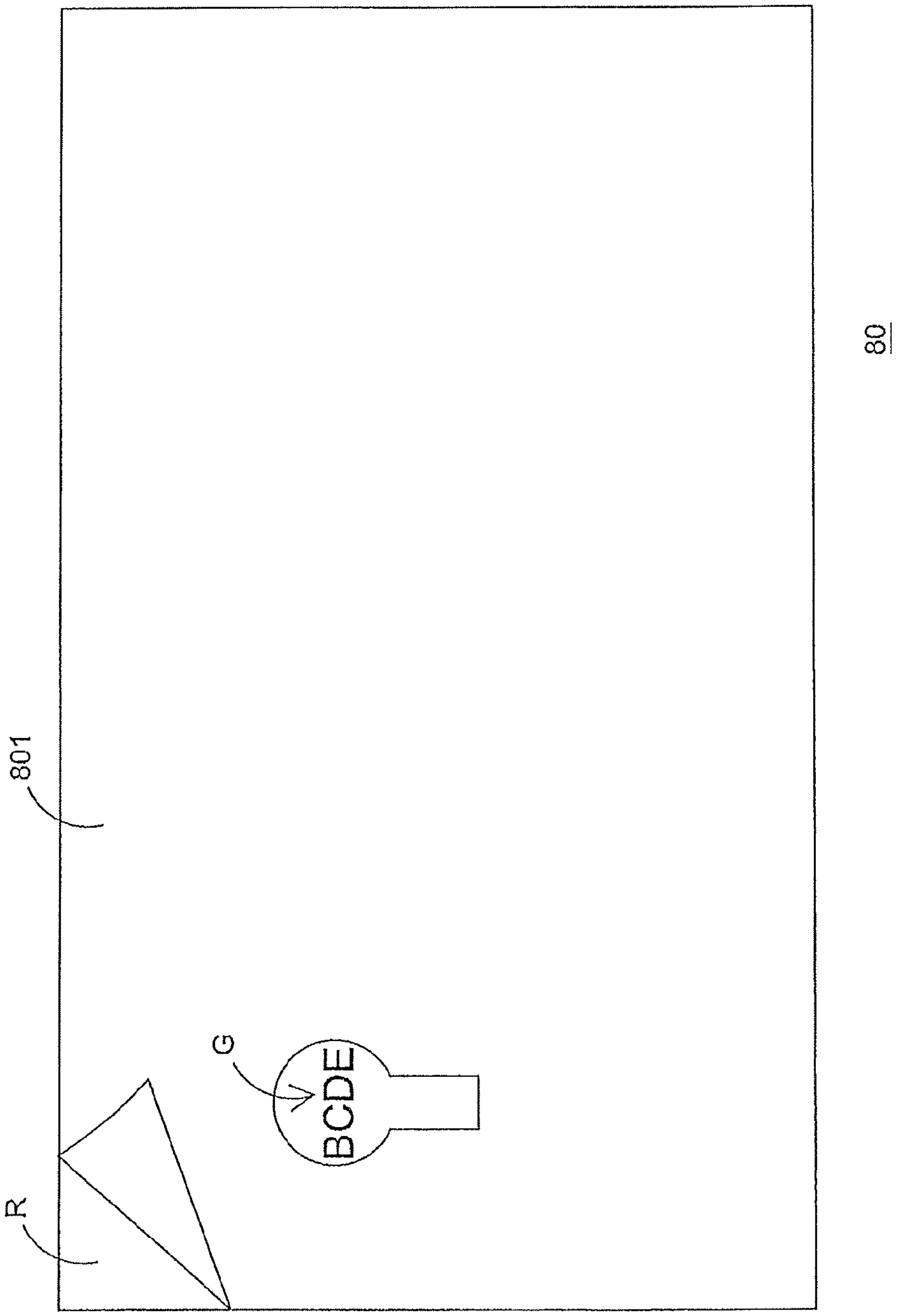
FIG. 8*a* is a top view illustration of the label of FIG. 8 in a nearly closed condition.

FIG. 8 is a top view illustration of another embodiment of a partially opened resealable label, 80. Label 80 includes a label ply 801. In this example, for purpose of illustration, graphics G are shown on a surface of a container R to which label 80 has been applied. An active portion of label 80 includes a portion 805 of ply 801 that may be removed to create a "window" to the surface of container R as shown in FIG. 8*a* with label 80 in a nearly closed condition.

Figure 8B:
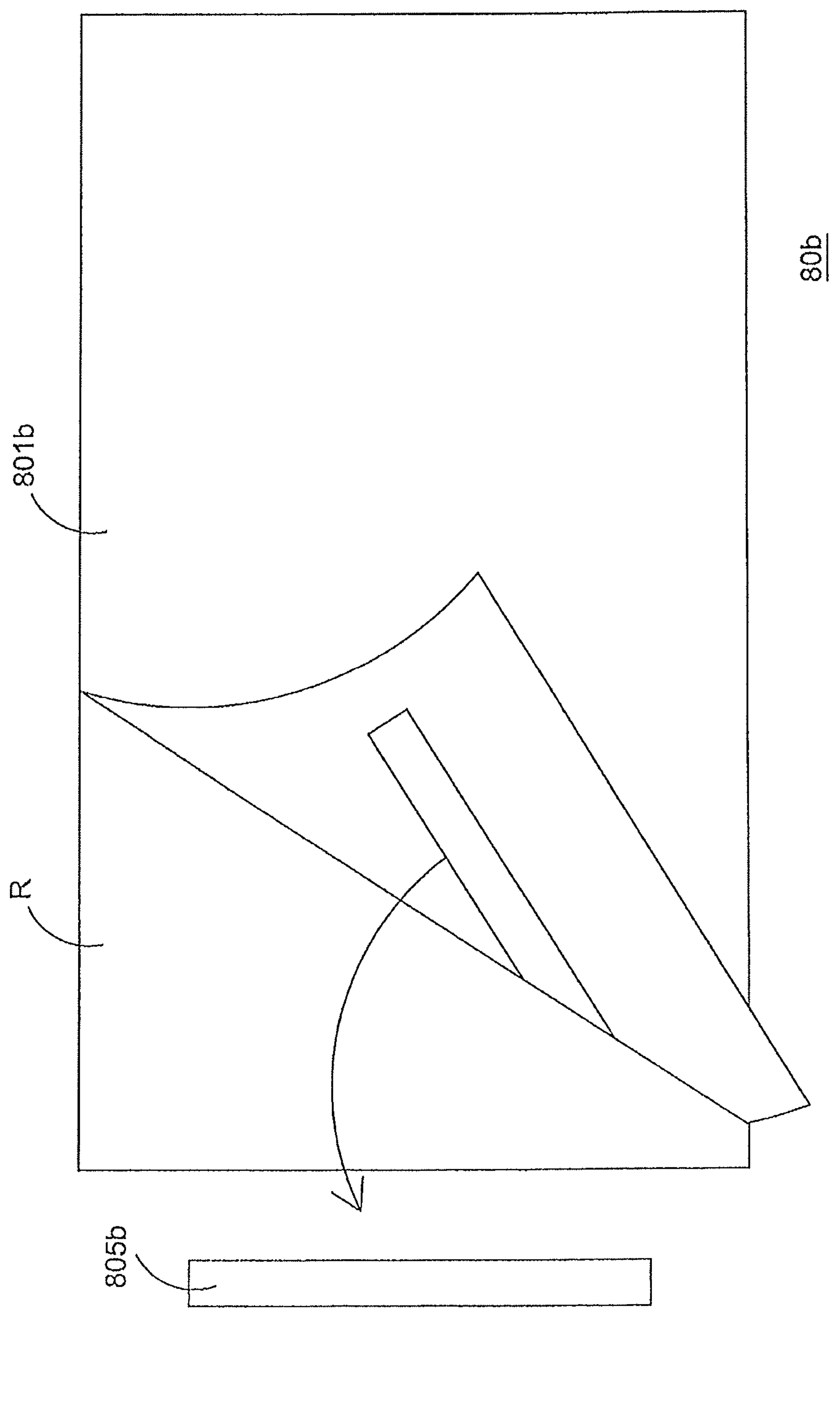
FIG. 8*b* is a top view illustration of another embodiment of a partially opened resealable label.

Additionally, in another embodiment of a partially opened resealable label, 80*b*, as shown in FIG. 8*b*, if label ply 801*b* was provided as an opaque material, then upon removing portion 805*b* from ply 801*b* a consumer or end-user could be able to, for example, visually observe a level of a product within a non-opaque container to which the label is adhered in a closed condition.

It is to be appreciated and understood that, although not specifically illustrated, a resealable label that incorporates a coupon feature could, additionally or alternatively, provide a removable element. For example, in FIG. 6, the active portion could comprise a removable element; and the removable element could comprise, for example, a proof-of-purchase device, a mail-in rebate form, a file information sheet, warranty information, a testing device or test strip, or a material safety data sheet as aforementioned.

Figure 9:
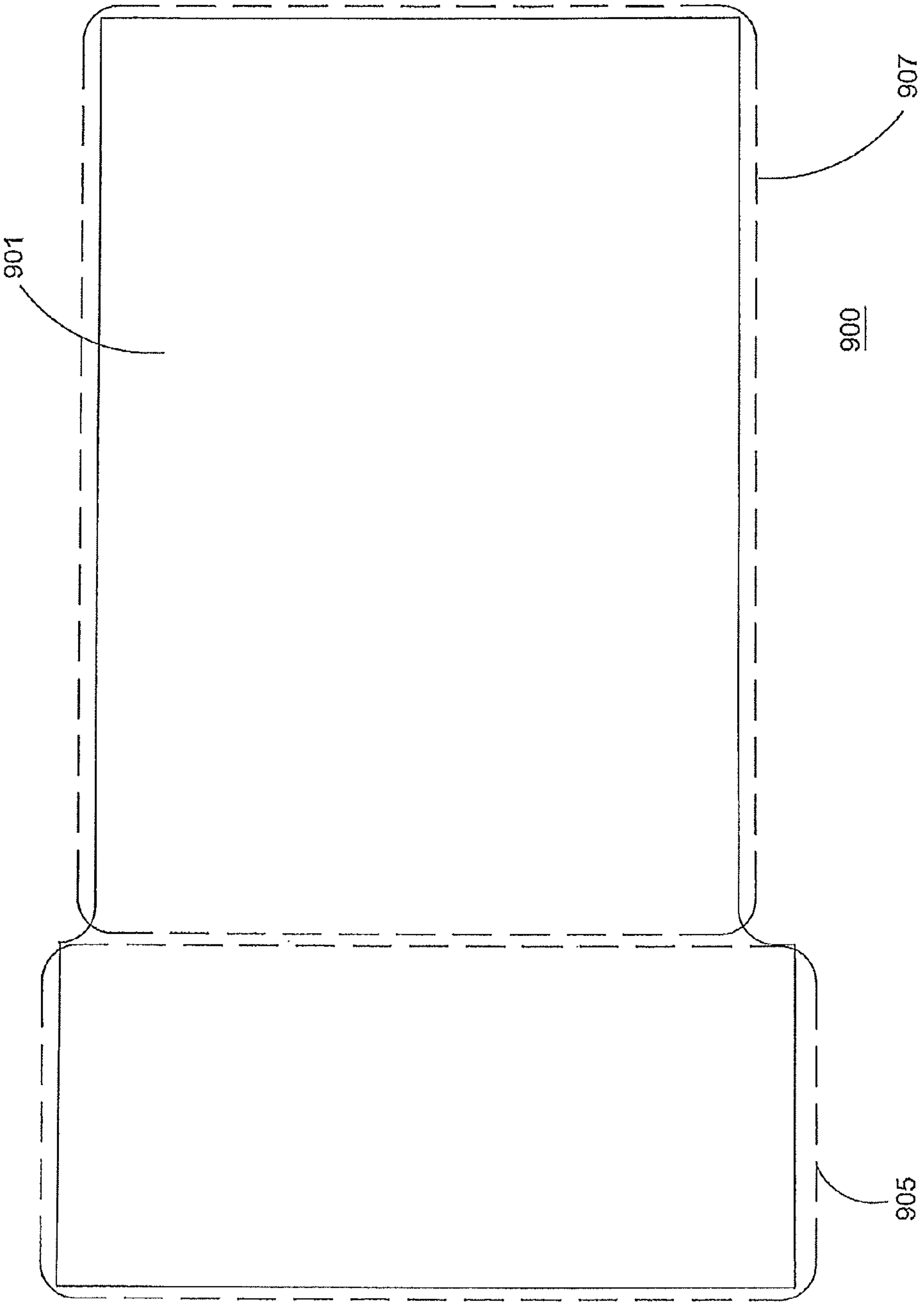
FIG. 9 is a top view illustration of another embodiment of a resealable label.

FIG. 9 is a top view illustration of another embodiment of a resealable label, 900. Label 900 includes a label ply 901 configured with a portion 905 of first dimensions and a portion 907 of second dimensions. It is to be appreciated and understood that when label 900 is adhered to a container such as an aerosol spray can, subsequently with a cap, a topmost region of portion 905 could reside under the cap while portion 907 could be sufficiently free from the cap to thereby advantageously enable opening and closing of the label while the cap remains on the can. It is also to be understood that dimensions of ply 901 could be any that define portions which could thus reside under the cap and be sufficiently free from the cap, to enable opening and closing of the label while the cap remains on the can as aforesaid. It is to be further understood that in another embodiment of label 900, although not specifically illustrated, ply 901 could be configured or dimensioned such that its bottom edge (with respect to portion 907 in FIG. 9) could correspond directly to and be commensurate with a bottom edge of portion 905.

Figure 10:
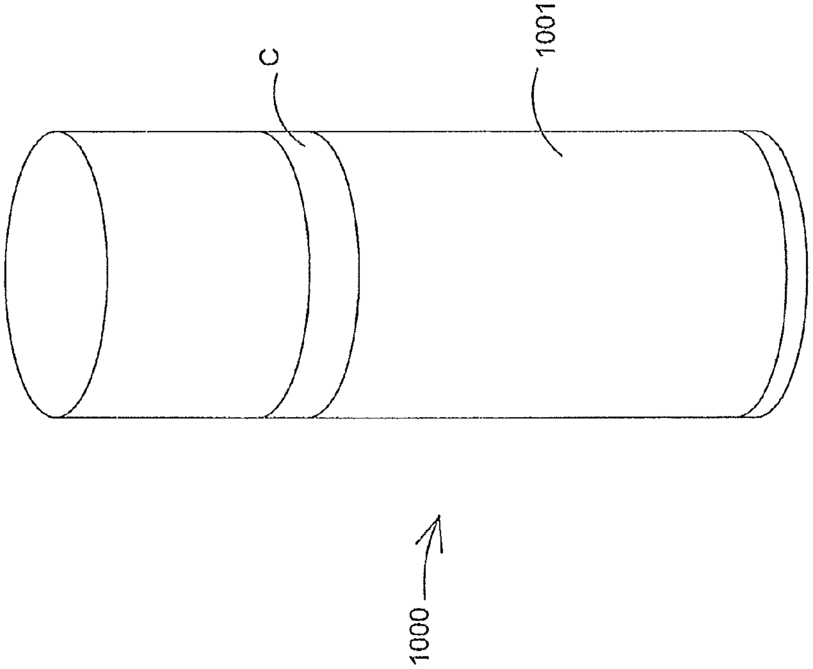
FIG. 10 is an illustration of another embodiment of a resealable label, adhered to a container.

FIG. 10 is an illustration of another embodiment of a resealable label, 1000, depicted as having been adhered to a container C (e.g., an aerosol spray can with a cap). Label 1000 includes a label ply 1001. In this embodiment, ply 1001 corresponds to dimensions of container C beneath the cap except for a topmost margin such that ply 1001 has a height (or label width) that is therefore less than a height of container C. It is to be appreciated and understood that when label 1000 is adhered to container C, subsequently with the cap, ply 1001 could be sufficiently free from the cap to thereby advantageously enable opening and closing of the label while the cap remains on the can. It is also to be understood that dimensions of ply 1001 could be any that provide sufficient freedom from the cap to enable opening and closing of the label while the cap remains on the can as aforesaid.

Figure 11:
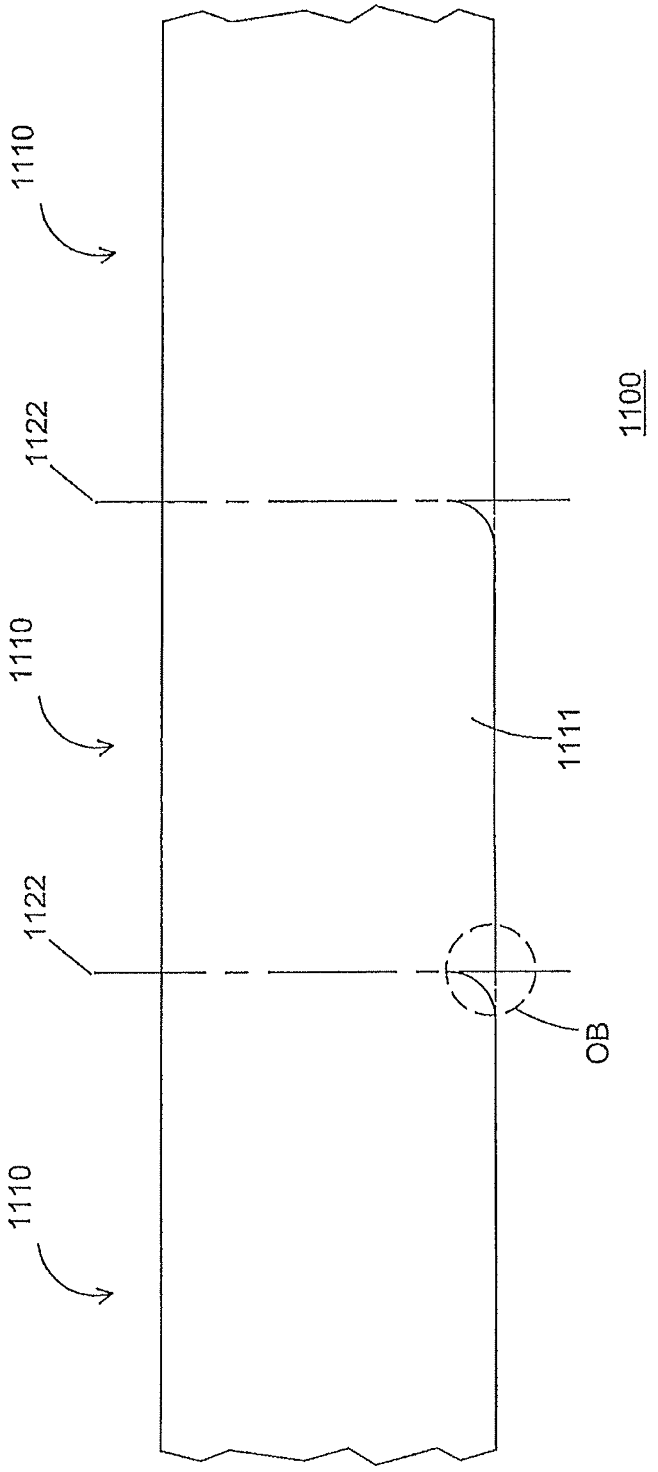
FIG. 11 is a top view illustration of an example of a portion of a label web for a resealable label.

FIG. 11 is an illustration of another example of a portion of a label web, 1100, for a resealable label, 1110. Each label 1110 includes a label ply 1111. Web 1100 is further defined by cut lines 1122, where the web may be cut by a roll-fed label application machine. Each label 1110 further includes an "overbite" area (OB) where a portion of ply 1111 is cut and removed. A purpose of overbite area OB is to enable a consumer or end-user to easily open label 1110, by allowing ply 1111 to be readily grasped and pulled away from an object to which label 1110 is adhered. Although shown in the drawing as a simple curve or arc at a bottom edge of the label, it is to be understood that overbite area OB could take any desired form or dimension, and be provided in any location in a resealable label, to permit such selective grasping and pulling of ply 1111 as aforesaid.

Figure 12:
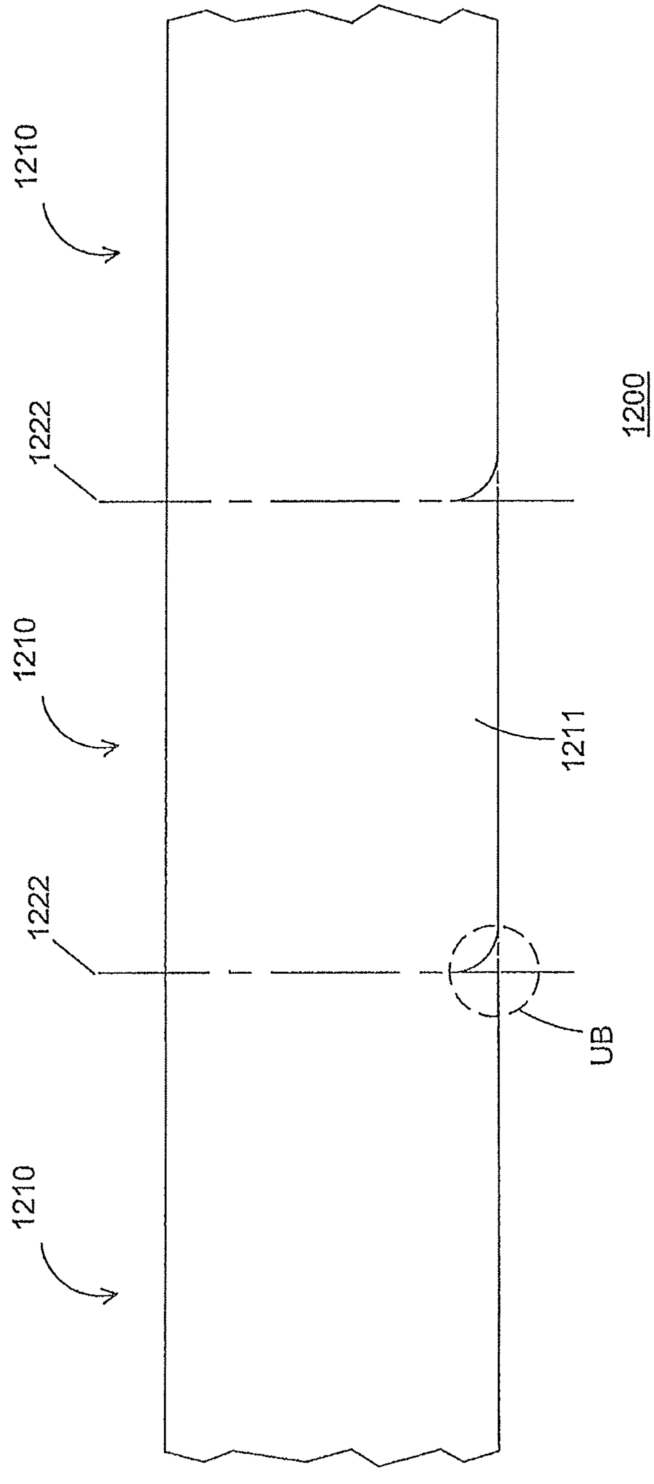
FIG. 12 is a top view illustration of another example of a portion of a label web for a resealable label.

FIG. 12 is an illustration of another example of a portion of a label web, 1200, for a resealable label, 1210. Each label 1210 includes a label ply 1211. Web 1200 is further defined by cut lines 1222, where the web may be cut by a roll-fed label application machine. Each label 1210 further includes an "underbite" area (UB) where a portion of ply 1211 is cut and removed. A purpose of underbite area UB is to enable a consumer or end-user to easily open label 1210, by allowing ply 1211 to be readily grasped and pulled away from an object to which label 1210 is adhered. Although shown in the drawing as a simple curve or arc at a bottom edge of the label, it is to be understood that underbite area UB could take any desired form or dimension, and be provided in any location in a resealable label, to permit such selective grasping and pulling of ply 1211 as aforesaid.

It is to be appreciated and understood that provision of an overbite or an underbite in a resealable label in examples described herein are predicated upon end E1 being the leading edge of the label and thus the first adhered to an object being labeled at point of application. However, in a particular embodiment of a resealable label where an underbite or overbite is intended to be provided, either end E1 or E2 could be leading with the overbite or underbite being thus provided consequently.

Figure 13:
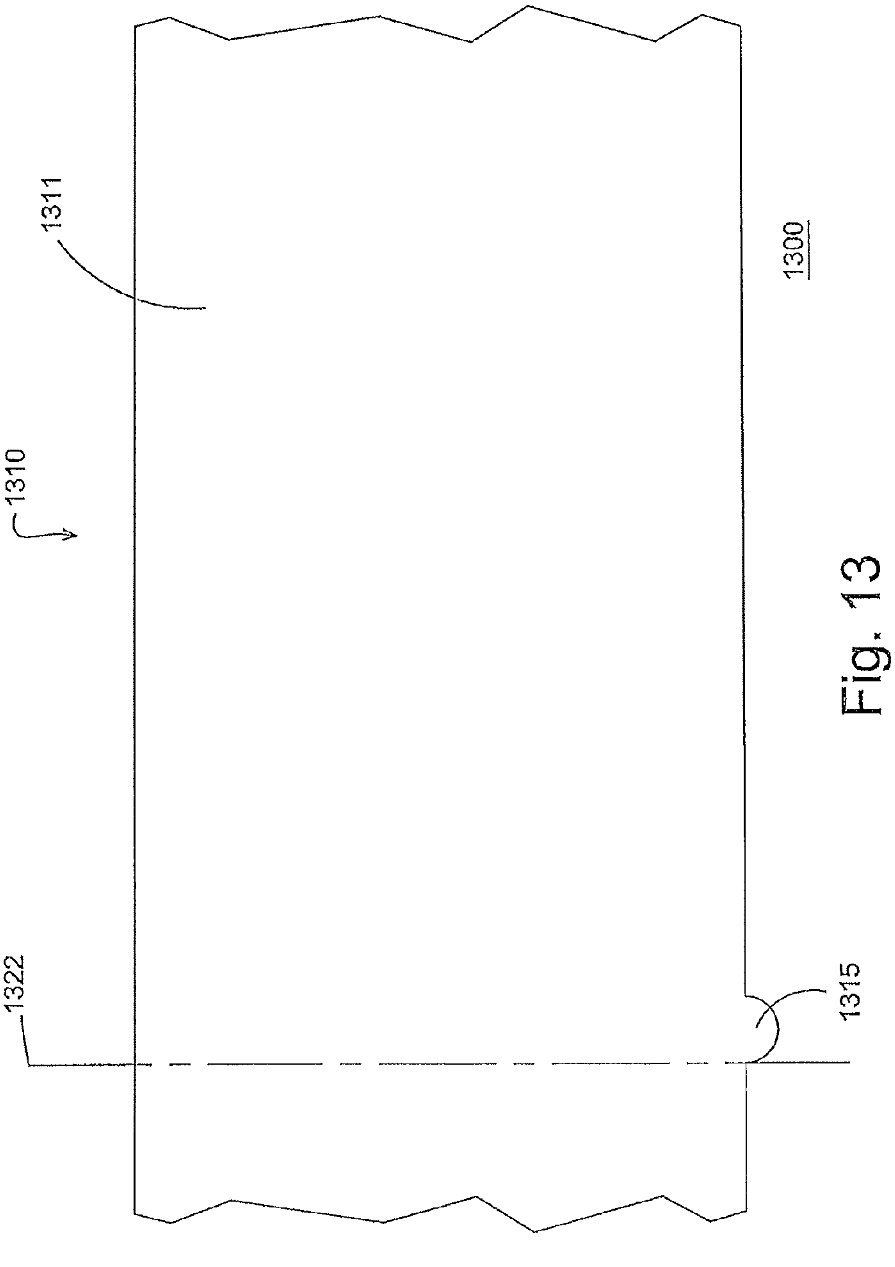
FIG. 13 is a top view illustration of another example of a portion of a label web for a resealable label.

FIG. 13 is an illustration of another example of a portion of a label web, 1300, for a resealable label, 1310. Each label 1310 includes a label ply 1311. Web 1300 is further defined by cut lines 1322, where the web may be cut by a roll-fed label application machine. Each label 1310 further includes a lift tab 1315 provided by an irregularly shaped portion of ply 1311 compared to its overall dimensions. A purpose of lift tab 1315 is to enable a consumer or end-user to easily open label 1310, by allowing ply 1311 to be readily grasped and pulled away from an object to which label 1310 is adhered. Although shown in the drawing as having a simple semi-circular geometry at a bottom edge of the label, it is to be understood that lift tab 1315 could take any desired form or dimension, and be provided in any location in a resealable label, to permit such selective grasping and pulling of ply 1311 as aforesaid.

Although not illustrated, it is to be appreciated and understood that a resealable label could include a so-called "scratch and sniff" feature. In such an embodiment, the scratch and sniff feature could be provided by way of, for example, a scratch and sniff coating on any desired surface of the label's ply.

It is to be appreciated and understood that in a particular embodiment of a resealable label, any areas or regions of the label defined by that label's height H, length L, or any combinations of its parameters, could serve as the active portion. In a particular embodiment of a resealable label, it is also to be appreciated and understood that any portion of any ply material could be made capable of intentional removal by a consumer or end-user by way of, e.g., strategic provision of a break path or break paths in the label. Additionally, it is to be appreciated and understood that in a particular embodiment of a resealable label, the label could have a plurality of separate active portions such as, e.g., a plurality of "windows" for, e.g., accommodation and presentation of multi-lingual information.

It is also to be appreciated and understood that in a particular embodiment of a resealable label, any combinations of stop points could be employed, either singularly or severally, and in any combinations, with break paths BP.

Regarding construction of a particular embodiment of a resealable label, the label ply could preferably be any commercially available web-like material that is capable of use in an in-line printing and converting process. Such a material could be, for example, polypropylene as is commercially available from AET Films of Terre Haute, Ind., in the U.S. As used herein, the term "web-like material" is intended to include any suitable label material, including paper, film, polypropylene, polyethylene, polyester, polyvinylchloride, polystyrene, foil, and ethylene vinyl acetate. The ply selectively could comprise a so-called "shrink promoting" material to conform to several or irregular curvatures of an object to which the label is applied. Such a material could be, but is not limited to, that which exhibits desired stretch and shrinkage characteristics such as are commercially available and known to those skilled in the art. Also, materials that permit non-destructive manipulation of a label, that may be utilized in constructions of various embodiments of a resealable label, could preferably be chosen from water-based, solvent-based, UV/EB, cold seal, heat seal, cohesive, and hot melt coatings as are commercially available. The material that permits non-destructive manipulation of the label is preferably chosen with respect to, and in combination with, the adhesive material at point of application to provide ease of opening, resealability, or other manipulation of the label.

Generally, it is to be appreciated and understood that several of those embodiments of a resealable label described herein could have particular utility in labeling objects or containers that have a regular shape, which may be cylindrical, or another shape, which is of constant circumference from top to bottom. Other objects or containers, however, may have coved or rounded top and bottom shoulder-type tapers which, it is to be understood, also could be accommodated by a particular embodiment of a resealable label. Furthermore, it is to be understood that any embodiment of a resealable label could be applied by so-called "cut-and-stack" labeling equipment to an object of interest to be labeled.

While this disclosure has been particularly shown and described with reference to accompanying figures, it will be understood, however, that modifications are possible. It should be appreciated that various components described herein may be substituted for other suitable components for achieving desired results, or that various accessories may be added thereto. Thus, for example, any aforementioned coatings, materials, and graphics could be selectively provided in any suitable combination or order, on or with any ply material or materials, and on any surfaces thereof, in construction of a resealable label as may be desired in a particular embodiment thereof.

Also, the depictions of various containers in the figures are only exemplary and not meant to be limiting.

It is to be understood that any suitable alternatives may be employed to provide a resealable label.

Lastly, the choice of compositions, sizes, and strengths of various components described herein are to be selected depending upon intended use.

Accordingly, these and other various changes or modifications in form and detail may be made to a resealable label, without departing from the true spirit and scope thereof.

What is claimed is:

1. A roll-fed label web for a resealable label, the roll-fed label web being constructed without an adhesive on its bottom side, for application by a roll-fed label application machine using separately supplied adhesive material at point of application, said roll-fed label web comprising:

a roll-fed label ply; and a material that permits non-destructive manipulation of said roll-fed label ply after it has been applied to an object to be labeled by the roll-fed label application machine.

2. The roll-fed label web of claim 1, from which an individual resealable label is produced when said roll-fed label web is cut by a label application machine, said resealable label further including an active portion.

3. The label of claim 2, wherein said active portion comprises a selected height and a selected length of said label.

4. The label of claim 2, further comprising at least one break path.

5. The label of claim 4, further comprising an accessory that is removably secured within said active portion.

6. The label of claim 4, wherein said active portion is provided in an interior portion of said label to open in a selected direction.

7. The label of claim 6, wherein said active portion is a removable coupon.

8. The label of claim 6, wherein said active portion is removable to thereby create a window to a surface of a container to which said label is adhered.

9. The label of claim 6, wherein said label ply is an opaque material.

10. The label of claim 2, wherein said label ply has (i) at least a first portion having first selected dimensions and (ii) at least a second portion having second selected dimensions that are smaller than said first selected dimensions.

11. The label of claim 2, wherein said label ply has at least one portion that is cut and removed from said ply to thereby provide an overbite area when said label is adhered to an object.

12. The label of claim 2, wherein said label ply has at least one portion that is cut and removed from said ply to thereby provide an underbite area when said label is adhered to an object.

13. The label of claim 2, wherein said label ply has at least one irregularly shaped portion that forms a lift tab.

14. The label of claim 2, further comprising a scratch and sniff feature.

15. A roll-fed label web for a resealable label, the roll-fed label web being constructed without an adhesive on its bottom side, for application by a roll-fed label application machine using separately supplied adhesive material at point of application, said roll-fed label web comprising a roll-fed label ply that inherently has a property that permits non-destructive manipulation of said label after it has been applied to an object to be labeled by the roll-fed label application machine.

16. The roll-fed label web of claim 15, from which an individual resealable label is produced when said roll-fed label web is cut by a label application machine, said resealable label further including an active portion.

17. The label of claim 16, wherein said active portion comprises a selected height and a selected length of said label.

18. The label of claim 16, further comprising at least one break path.

19. The label of claim 18, further comprising an accessory that is removably secured within said active portion.

20. The label of claim 18, wherein said active portion is provided in an interior portion of said label to open in a selected direction.

21. The label of claim 20, wherein said active portion is a removable coupon.

22. The label of claim 20, wherein said active portion is removable to thereby create a window to a surface of a container to which said label is adhered.

23. The label of claim 20, wherein said label ply is an opaque material.

24. The label of claim 16, wherein said label ply has (i) at least a first portion having first selected dimensions and (ii) at least a second portion having second selected dimensions that are smaller than said first selected dimensions.

25. The label of claim 16, wherein said label ply has at least one portion that is cut and removed from said ply to thereby provide an overbite area when said label is adhered to an object.

26. The label of claim 16, wherein said label ply has at least one portion that is cut and removed from said ply to thereby provide an underbite area when said label is adhered to an object.

27. The label of claim 16, wherein said label ply has at least one irregularly shaped portion that forms a lift tab.

28. The label of claim 16, further comprising a scratch and sniff feature.

29. A roll-fed label web for a resealable label, the roll-fed label web being constructed without an adhesive on its bottom side, for application by a roll-fed label application machine using separately supplied adhesive material at point of application, said roll-fed label web comprising a roll-fed label ply from which an individual resealable label is produced when said roll-fed label web is cut by a label application machine, wherein (i) said label application machine provides an adhesive material of sufficiently low aggressiveness to said resealable label at point of application to permit non-destructive manipulation thereof and (ii) said resealable label further includes an active portion.

30. The label of claim 29, wherein said active portion comprises a selected height and a selected length of said label.

31. The label of claim 29, further comprising at least one break path.

32. The label of claim 31, further comprising an accessory that is removably secured within said active portion.

33. The label of claim 31, wherein said active portion is provided in an interior portion of said label to open in a selected direction.

34. The label of claim 33, wherein said active portion is a removable coupon.

35. The label of claim 33, wherein said active portion is removable to thereby create a window to a surface of a container to which said label is adhered.

36. The label of claim 33, wherein said label ply is an opaque material.

37. The label of claim 29, wherein said label ply has (i) at least a first portion having first selected dimensions and (ii) at least a second portion having second selected dimensions that are smaller than said first selected dimensions.

38. The label of claim 29, wherein said label ply has at least one portion that is cut and removed from said ply to thereby provide an overbite area when said label is adhered to an object.

39. The label of claim 29, wherein said label ply has at least one portion that is cut and removed from said ply to thereby provide an underbite area when said label is adhered to an object.

40. The label of claim 29, wherein said label ply has at least one irregularly shaped portion that forms a lift tab.

41. The label of claim 29, further comprising a scratch and sniff feature.

* * * * *